United States Patent Office 2,793,537
Patented May 28, 1957

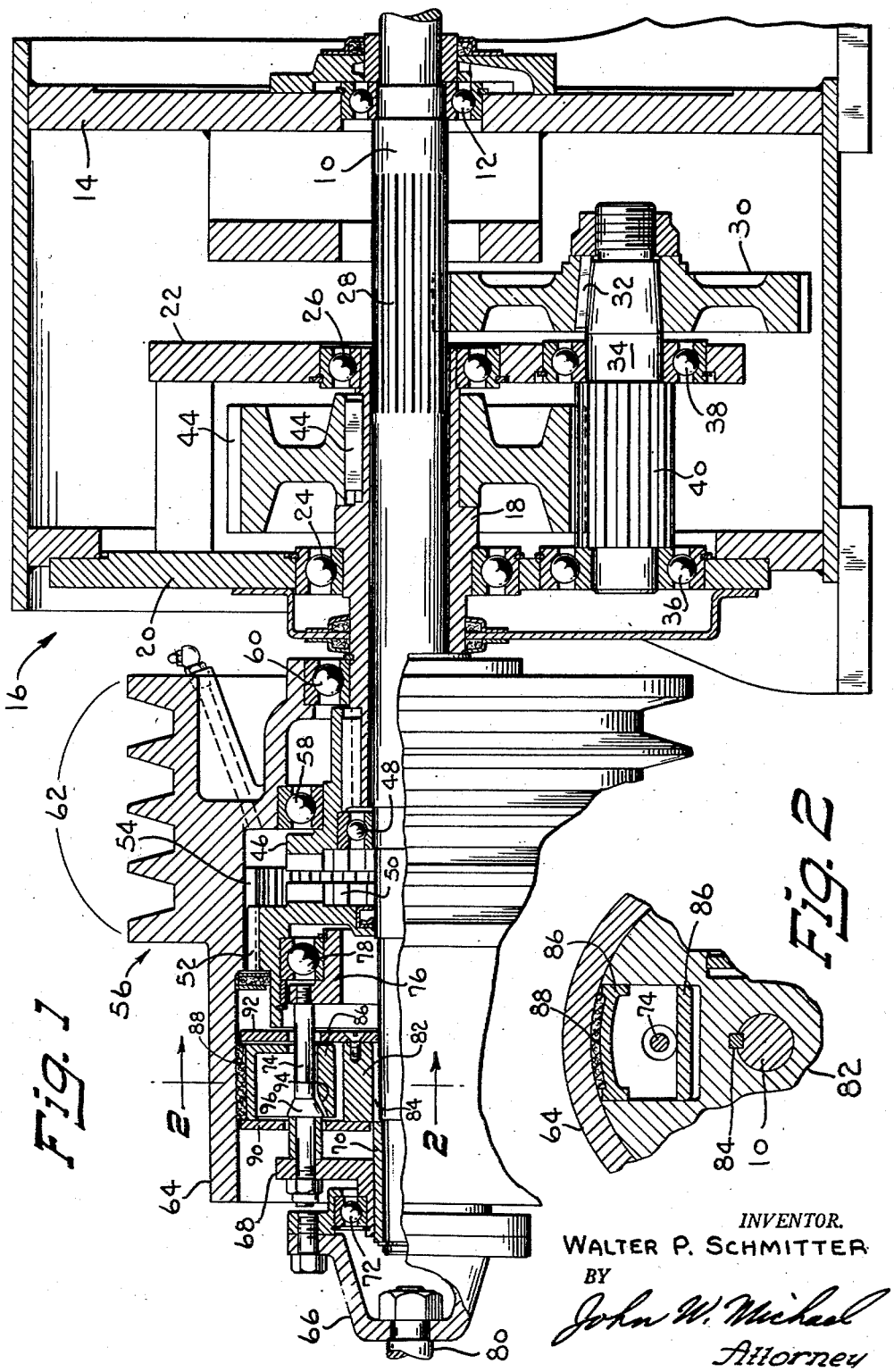

---

2,793,537
TWO SPEED DRIVE

Walter P. Schmitter, Milwaukee, Wis., assignor to Falk Corporation, Milwaukee, Wis., a corporation of Wisconsin Application June 2, 1954, Serial No. 433,910

6 Claims. (Cl. 74—330)

This invention relates to drive mechanisms primarily for washing and dry cleaning machines although the novel features thereof may be utilized to advantage in machines of various other types, particularly those requiring two-speed operation.

Washing and dry cleaning machines of commercial type ordinarily include a rotary drum operable at one speed to perform washing and rinsing functions and at a much higher speed to extract by centrifugal action the washing or rinsing fluid from the materials treated.

In machines of this type, it is standard practice to employ two alternatively operable driving motors, one effective during the washing and rinsing cycles and the other effective dring the extracting cycles. Both are expensive motors having special operating characteristics. One is commonly a reversing motor having high slip capacity. This motor, during the washing and rinsing cycles, is clutch-connected to the drum usually through suitable speed reduction gearing and is repeatedly reversed so as to impart to the drum a desirable intermittently reversing rotary motion at a speed appropriate for effective washing and rinsing. The other motor is of materially greater power capacity and capable of developing an unusually high starting torque. It is usually permanently connected to the drum independently of the above noted reduction gearing and, when energized, drives the drum at a high speed appropriate for the fluid extracting function.

One object of the present invention is to provide an improved washing machine drive which will permit the use of a single driving motor without impairing any of the above noted operational characteristics of the machine.

Another object is to provide a simplified, compact, reliable and less expensive two-speed drive for washing machines and the like.

Another object is to provide a simple compact two-speed drive wherein full motor speed may be utilized to best advantage in obtaining high speed operation well above the other available speed.

The drive herein shown includes generally a speed reducer having a motor driven input shaft, an output quill shaft aligned therewith and through which the input shaft extends, and an interconnecting gear train through which the output shaft is driven at a speed lower than that of the input shaft. A hollow pulley structure supported by and freely rotatable with respect to the quill shaft is drivingly connectable to the input or output shafts selectively through appropriate clutches preferably housed within the pulley structure. The pulley structure is thus operable either at motor speed or at the lower quill shaft speed. This results in a simple, readily installed, compact operating unit by which a washing machine or other mechanism may be driven from the pulley structure at either of two widely different speeds by power derived from a single motor.

Objects and advantages other than those appearing above will be pointed out in, or be apparent from, the specification and claims, as will obvious modifications of the single embodiment shown in the drawings, in which:

Fig. 1 is a fragmentary view partly in section and with parts broken away to illustrate the reducer and clutch assembly; and Fig. 2 is a detiled section of one element of the centrifugal clutch taken on line 2—2 in Fig. 1.

The right-hand end of shaft 10 is adapted to be directly driven by a motor through a suitable coupling and is rotatably supported by bearing 12 in right-hand wall 14 of the speed reducer housing 16. The left-hand end of shaft 10 extends through housing 16 and, as will appear hereinafter, is suitably supported. It will be noted that the shaft extends through quill 18 rotatably supported in the housing wall 20 and bracket 22 by bearings 24, 26 respectively. The quill also extends from the housing and is driven at a low speed by reduction gearing including pinion 28 formed on shaft 10 engaging gear 30 keyed at 32 to jack shaft 34 rotatably mounted in the left housing wall 20 and bracket 22 by bearings 36, 38. The jack shaft has a pinion 40 thereon meshing with gear 42 keyed at 44 to the quill 18.

Input 46 of a jaw clutch is keyed or otherwise fixed to the left end of quill 18 and provides support for the left end of shaft 10 by means of bearing 48. Clutch output 50 is mounted for axial movement to engage and disengage with the input 46 and is provided with external splines 52 which constantly mesh with interal spline 54 on the inside of the hollow pulley structure 56 rotatably mounted on clutch input 46 and the quill by means of bearings 58, 60. The pulley structure 56 includes a four-belt pulley 62 and a brake drum 64 on which a separate brake may act. Thus, the hollow pulley structure 56 serves as the output pulley, brake drum, and as a housing for the clutches.

As shown in the drawings, the jaw clutch is not engaged. In order to engage the jaw clutch, bell 66 at the left end of the shaft is moved to the right to act through bearing 72 on flanged sleeve 68 slidably mounted on shaft mounted bushing 70. Movement of the bell 66 forces actuating pins 74 carried by sleeve 68 to the right to move flanged member 76 to the right to act on the clutch output jaw 50 through bearing 78. During movement of the clutch output the external teeth 52 maintain engagement with the inside splines 54 of the pulley structure 56. The jaw clutch is disengaged by moving bell 66 to the left. The bell is actuated by shaft 80 which may be connected to any suitable actuating mechanism such as an hydraulic system or a solenoid arrangement.

A centrifugal clutch input member 82 is keyed to shaft 10 at 84 and carries a set of equally spaced hollow centrifugal shoes 86 radially guided therein and provided with friction pads 88 adapted to engage the interior of pulley 56. The shoes are retained in the driving member preferably by means of side plates 90, 92. It will be noted that shoes 86 and plates 90, 92 are aperatured to permit actuating pins 74 to project freely through the centrifugal clutch. The inside surface of the bottom of each shoe 86 is provided with an inclined face 94 against which cam 96 on actuating pin 74 acts when bell 66 is moved to the right. Thus, when bell 66 is moved to the right to engage the jaw clutch, shoes 86 are moved inwardly by cam 96 to prevent engagement thereof with pulley 56 while the jaw clutch is engaged.

When high-speed operation is desired, the clutches will be in the position shown in Fig. 1. Under this condition the input shaft, assumed to be rotating at 1750 R. P. M., will drive the pulley structure 56 at 1750 R. P. M. Since the centrifugal clutch will not engage until the drive motor approaches normal operating speed the motor need not have a high starting torque as required in drives previously employed for washing and dry cleaning machines. When it is desired to drive the pulley at a reduced speed, bell 66 is moved to the right to disengage the centrifugal clutch and engage the jaw clutch so quill 18 will drive the sheave at 69.5 R. P. M.

A further advantage of the present structure resides in the use of a jaw clutch during the slow speed washing and rinsing operations in that the jaw clutch is well adapted to withstand the severe inertia forces induced by the repeated reversals of rotary motion occurring in these portions of the washing process.

From the above description, it will be apparent that the present structure occupies little more space than that required for a speed reducer, a V belt pulley, and a brake drum. The only additional space required is that required for the actuating apparatus which moves bell 66 to select the clutch to be placed into operation. The space devoted to this apparatus does not take much more than would be required for a pilot bearing assembly for the left end of shaft 10. In operation as a washing machine drive, the slow speed is used during the washing and rinsing cycles and the high speed is used for the extracting cycles. A brake may be used to act on drum 64 to bring the driven apparatus to a quick stop when the motor is de-energized. This allows easy shifting of the clutch selecting mechanism.

The various controls necessary for automatic cycling and selection of the various speeds form no part of this invention.

Although but one embodiment of the present invention has been illustrated and described, it will be apparent to those skilled in the art that various changes and modifications may be made therein without departing from the spirit of the invention or from the scope of the appended claims.

I claim:

1. A transmission comprising, a pair of co-axial drive shafts rotatable at different speeds, a driven member generally co-axial with said shafts, a jaw clutch having its input side drivingly connected to one of the shafts and its output side connected to the driven member, said jaw clutch requiring movement of its output side axially of the shafts to engage or disengage, means for imparting axial movement to the jaw clutch, a centrifugal clutch having its input side connected to the other of said shafts and its output side connected with said driven member, said centrifugal clutch including members adapted to be thrown outwardly in response to rotation of its input, and provided with frictional surfaces for driving said driven member, and means responsive to actuation of said movement imparting means in the jaw clutch engaging direction to move the speed responsive members of the centrifugal clutch inwardly to prevent engagement of the frictional surfaces with the driven member.

2. A two-speed drive comprising, a drive shaft, a quill co-axial with the drive shaft, speed change gearing interconnecting the drive shaft and the quill, a driven member mounted for rotation with respect to the shaft and the quill and co-axial with the shaft and the quill, a jaw clutch having its input connected to said quill and its output connected to said driven member for drivingly interconnecting the quill and the driven member when the clutch is engaged, said output of said jaw clutch having a sliding connection with the driven member and being adapted for axial movement to engage and disengage the jaw clutch, a friction clutch for interconnecting the shaft and the driven member with the friction clutch input member connected to the shaft and the friction clutch output member connected with the driven member, means for imparting axial movement to the jaw clutch output to engage and disengage the jaw clutch, and means responsive to actuation of the first means to act on the friction clutch to prevent engagement thereof when the jaw clutch is engaged.

3. A drive according to claim 2 in which the driven member comprises, a belt pulley which covers both of said clutches.

4. A transmission comprising, a pair of co-axial drive shafts rotatable at different speeds, a driven member generally co-axial with said shafts, an axially engageable clutch having its input side drivingly connected to one of the shafts and its output side connected to the driven member, a radially engageable clutch having its input side connected to the other of said shafts and its output side connected with said driven member, and means for imparting axial movement to the first clutch to engage and disengage the first clutch and including means for simultaneously imparting radial movement to the second clutch to disengage the second clutch upon engagement of the first clutch.

5. A transmission according to claim 4 in which the movement imparting means for the second clutch includes cam means operable to disengage the second clutch in response to actuation of the movement imparting means in a direction to axially engage the first clutch.

6. A transmission according to claim 4 in which the first clutch is a jaw clutch, and the second clutch is a friction clutch the input side of which includes a part centrifugally urged toward frictional driving engagement with the output side thereof, and means controlled by the movement imparting means for holding the centrifugally urged part out of engagement with the output side of the second clutch when the first clutch is engaged.

References Cited in the file of this patent

UNITED STATES PATENTS

| | | |
|---|---|---|
| 447,334 | Letiecq | Mar. 3, 1891 |
| 1,222,715 | Beckwith | Apr. 17, 1917 |
| 2,594,666 | Long | Apr. 29, 1952 |